April 20, 1937.　　　　R. L. MARTIN　　　　2,078,213
CUSHIONING MEANS FOR BICYCLE FRAMES
Filed Sept. 26, 1935　　　2 Sheets-Sheet 1

Inventor
R. L. Martin
By L. F. Randolph Jr.
Attorney

April 20, 1937.    R. L. MARTIN    2,078,213
CUSHIONING MEANS FOR BICYCLE FRAMES
Filed Sept. 26, 1935    2 Sheets-Sheet 2

Inventor
R. L. Martin.
By L. F. Randolph, Jr.
Attorney

Patented Apr. 20, 1937

2,078,213

UNITED STATES PATENT OFFICE 2,078,213

CUSHIONING MEANS FOR BICYCLE FRAMES

Roy L. Martin, Tyler, Tex.

Application September 26, 1935, Serial No. 42,330

1 Claim. (Cl. 208—97)

The invention relates to bicycle frames and has for its principal object the provision of means for cushioning the action of the front and rear wheels, the invention relating particularly to that type of bicycle commonly known as the "safety bicycle".

The principal object of the invention is the provision of means whereby the riding qualities of a bicycle may be improved and made more comfortable, and to that end the invention includes spring means for resiliently supporting the wheels in the frame of the bicycle so that the rider will not be subjected to jolts and vibrations incident to riding over rough roads.

Figure 1:
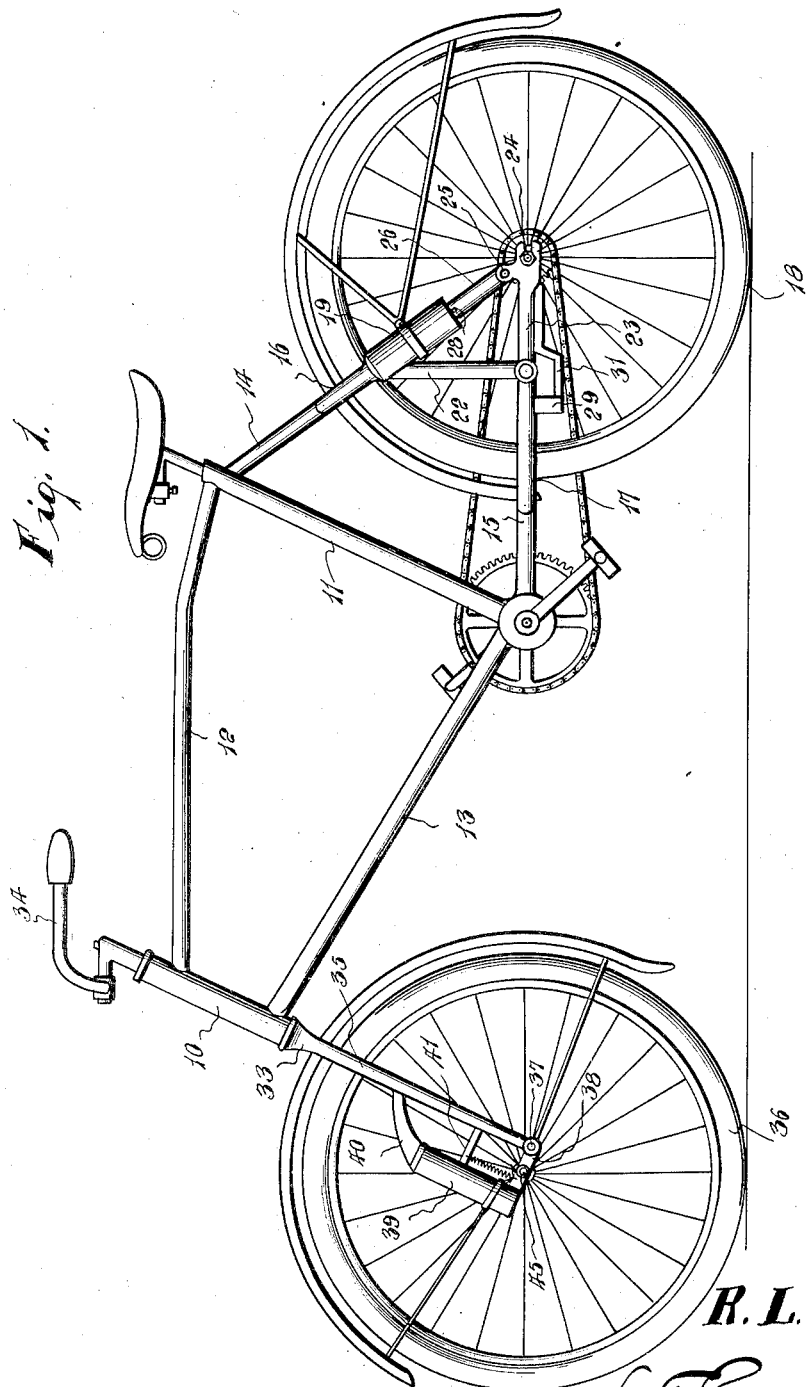
Figure 2:
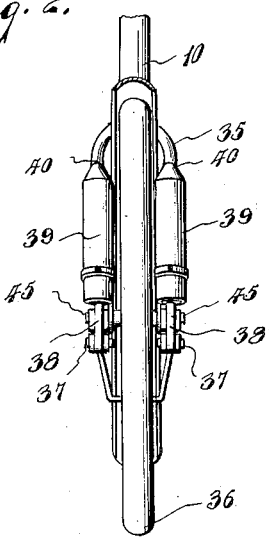
Figure 3:
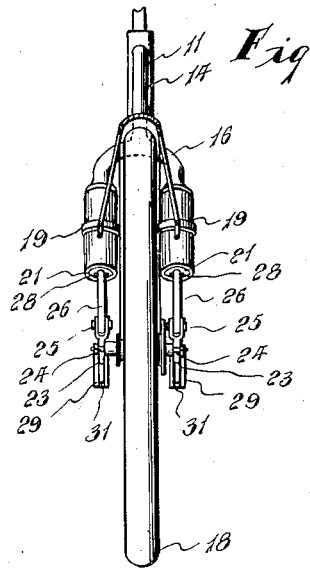
Figure 4:
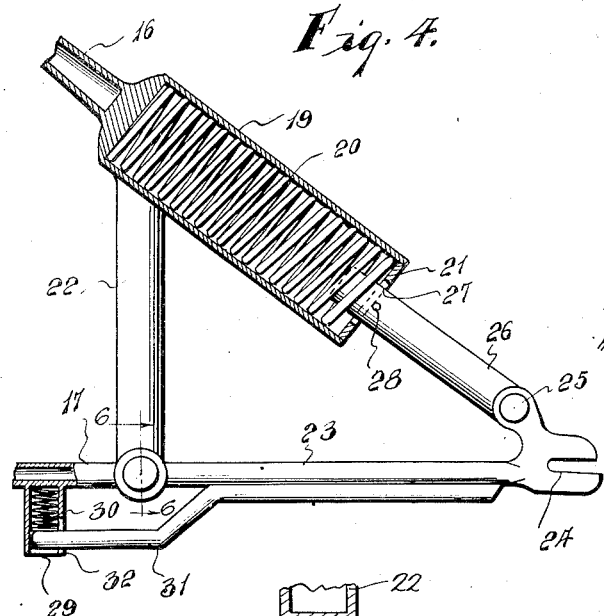
Figure 5:
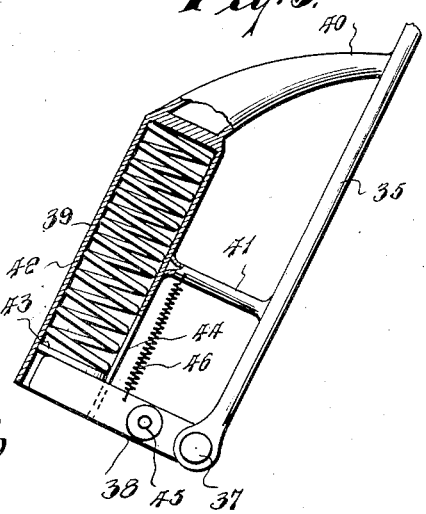
Figure 6:
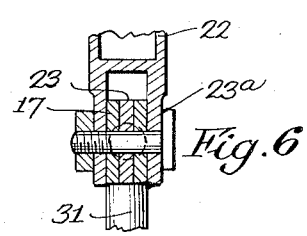

The invention will be described in detail hereinafter and will be found illustrated in the accompanying drawings in which Figure 1 is a side view in elevation of the improved bicycle showing the resilient cushion means applied thereto, Figure 2 is a front view showing the front wheel and its cushioning means, the handle frame member being shown fragmentarily, Figure 3 is a rear view showing the means for cushioning the rear wheel, the upper frame being shown fragmentarily and the rear mud guard removed, Figure 4 is an enlarged view partly in section of the cushioning means for the rear wheel, Figure 5 is a similar view of the cushioning means for the front wheel, and Fig. 6 is a fragmentary sectional view taken on the line 6—6 on Fig. 4, and viewed in the direction indicated by the arrows.

As shown in the drawings, and in which similar reference characters are used to designate corresponding parts throughout the several views, the bicycle is shown with what is ordinarily designated a diamond frame, having the steering head 10, the seat post 11, upper and lower bars 12 and 13 connecting the steering head 10 and the seat post 11. 14 designates the upper rear frame member, and 15 the lower frame member, each of said members being provided with bifurcated extremities 16 and 17, respectively, to receive the rear or driving wheel 18.

19 designates cylindrical housings which are continuations of the sides or furcations of the fork or bifurcated portion 16, and having mounted therein expansible springs 20, shown in detail in Figure 4, and slidably mounted therein the plunger 21 engaging said spring 20 at one of its terminals.

A brace 22 is provided for and connects each of the housings 19 with the ends of the sides or furcations of the fork or bifurcated portion 17 on the corresponding side of the frame. Pivotally secured at the joint between the members 17 and 22, on each side of the bicycle, is a rearwardly extended arm 23 provided with an open slot 24 which permits adjustment of the rear wheel 18 therein, said slot being provided to receive the axle of the rear wheel in the ordinary manner. Pivoted to an upstanding ear 25 on the free end of the arm 23 is a rod 26, that has its free end engaged in an opening 27 in the plunger 21, and provided with a projecting pin 28 engaging the outer surface of said plunger and providing means for compressing the spring 20 in cushioning the action of the wheel 18.

Depending from the upper side of each side of the fork 17 is a housing 29 on which is mounted an expansible coil spring 30, and extending rearwardly and secured to the arm 23 is an arm 31 which engages said spring 30 and is movable in a slotted opening 32 in the side of the housing 29, the object of the spring 30 is to cushion the rebound or expansion of the spring 20 after having been compressed, and thereby improve the cushion action of the wheel 18.

Steering member 33 that is rotatably mounted in the steering head 10, and actuated by the handlebar 34, is bifurcated as shown at 35 and receives the hub wheel 36, and pivotally secured at the extremities of the sides or furcations of the fork or bifurcated portion 35 as shown at 37 is a lever 38.

39 designates the housing which is mounted on each of the sides of the fork 35, and has a frame member 40 extending from its closed end and welded or otherwise secured to the fork member, and is also connected to the fork member by means of a strut 41. Mounted in the housing 39 is an expansible coil spring 42 having a plunger 43 engaging its outer extremity, and said plunger 43 is in turn engaged by the free end of the lever 38, the housing 39 being provided with an elongated slotted opening 44, for the movement of the lever 38 in compressing the spring 42.

The axle of the front wheel 36 is secured to the lever 38 intermediate of pivot 37 and housing 39, as shown at 45, so that when encountering unevennesses in the road and in passing over obstructions, the lever 38 will move in the slot 44 to compress the spring 42 to relieve the operator of the bicycle of the effects of the obstruction or uneveness in the road.

46 indicates a contractile coil spring connecting the lever 38 and the strut 41 intermediate of the wheel axle connection 45 and the housing 39, which serves to counteract the rebound of the spring 42 in expanding after compression.

I claim as my invention:—

In a bicycle, a bifurcated frame member to receive a wheel, a housing in each frame member, a second frame member having a bifurcated portion to receive the wheel, an arm connecting each housing with each last mentioned bifurcated portion, an arm pivotally secured to each bifurcated portion and providing a support for the wheel, an expansible spring mounted in each housing, plungers in the housings engaging the springs, rods pivotally secured to said arms and engaging the plungers, cushion springs mounted on the last mentioned bifurcated portions, and second arms extending from the first mentioned arms and engaging the cushion springs.

ROY L. MARTIN.